(12) United States Patent
Caulfield et al.

(10) Patent No.: US 12,050,805 B2
(45) Date of Patent: Jul. 30, 2024

(54) CONTROL OF BULK MEMORY INSTRUCTIONS

(71) Applicant: Arm Limited, Cambridge (GB)

(72) Inventors: Ian Michael Caulfield, Cambridge (GB); Abhishek Raja, Austin, TX (US); Alexander Alfred Hornung, Cambridge (GB)

(73) Assignee: Arm Limited, Cambridge (GB)

( * ) Notice: Subject to any disclaimer, the term of this patent is extended or adjusted under 35 U.S.C. 154(b) by 32 days.

(21) Appl. No.: 17/875,758

(22) Filed: Jul. 28, 2022

(65) Prior Publication Data
US 2024/0036760 A1 Feb. 1, 2024

(51) Int. Cl.
*G06F 3/06* (2006.01)
*G06F 12/0802* (2016.01)

(52) U.S. Cl.
CPC .......... *G06F 3/0655* (2013.01); *G06F 3/0604* (2013.01); *G06F 3/0671* (2013.01); *G06F 12/0802* (2013.01); *G06F 2212/60* (2013.01)

(58) Field of Classification Search
CPC .... G06F 3/0604; G06F 3/0655; G06F 3/0671; G06F 2212/60
USPC ....................................................... 711/127
See application file for complete search history.

(56) References Cited

U.S. PATENT DOCUMENTS

2016/0217080 A1* 7/2016 Solihin ............... G06F 12/0837
2016/0378493 A1* 12/2016 Burger .................. G06F 9/3836
712/205

OTHER PUBLICATIONS

Arm Limited, Proprietary Notice—CPYP, CPYM, CPYE, 2021, 8 pages.

* cited by examiner

*Primary Examiner* — Hua J Song
(74) *Attorney, Agent, or Firm* — NIXON & VANDERHYE P.C.

(57) ABSTRACT

An apparatus supports decoding and execution of a bulk memory instruction specifying a block size parameter. The apparatus comprises control circuitry to determine whether the block size corresponding to the block size parameter exceeds a predetermined threshold, and performs a micro-architectural control action to influence the handling of at least one bulk memory operation by memory operation processing circuitry. The micro-architectural control action varies depending on whether the block size exceeds the predetermined threshold, and further depending on the states of other components and operations within or coupled with the apparatus. The micro-architectural control action could include an alignment correction action, cache allocation control action, or processing circuitry selection action.

20 Claims, 10 Drawing Sheets

CONTROL OF BULK MEMORY INSTRUCTIONS

BACKGROUND

Technical Field

The present technique relates to the field of data processing.

Technical Background

Some data processing systems support handling of bulk memory instructions, in which memory operations are performed across a specified region of memory. These instructions would typically be generated based on compiling a high-level code written by a programmer. High-level programming languages such as C includes functions for moving data in memory, or comparing or scanning strings of data which can be apparently simple to call as a programmer. However, due to the potentially large regions of memory that a bulk memory instruction can specify, the particular implementation of these functions in the processor may introduce some challenges, that may cause significant negative performance impacts on the data processing system.

SUMMARY

At least some examples of the present technique provide an apparatus comprising:
decoding circuitry to decode instructions; memory operation processing circuitry to perform memory operations; wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold.

At least some examples of the present technique provide a method comprising: decoding a sequence of instructions; performing memory operations; wherein the decoding includes decoding a bulk memory instruction specifying a block size parameter to control performance of at least one bulk memory operation on a block of memory of a size no greater than a block size corresponding to the block size parameter; and determining whether the block size corresponding to the block size parameter exceeds a predetermined threshold, and performing a micro-architectural control action to influence handling of the at least one bulk memory operation, the micro-architectural control action depending on whether the block size corresponding to the block size parameter exceeds the predetermined threshold.

At least some examples of the present technique provide a non-transitory computer-readable medium to store computer-readable code for fabrication of an apparatus comprising: decoding circuitry to decode instructions; memory operation processing circuitry to perform memory operations; wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold.

Further aspects, features and advantages of the present technique will be apparent from the following description of examples, which is to be read in conjunction with the accompanying drawings.

DESCRIPTION OF EXAMPLES

Figure 1:
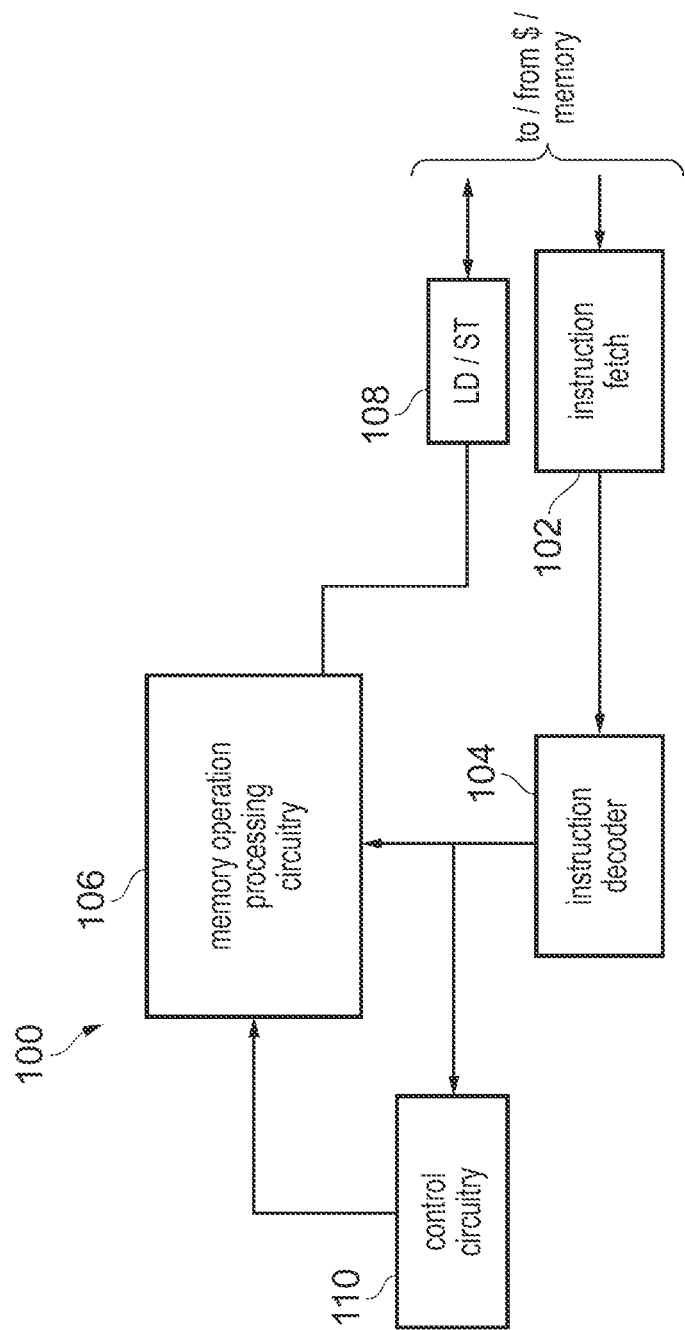
FIG. 1 illustrates an example apparatus.

The apparatus supports handling of a bulk memory instruction specifying a block size parameter. When executing a bulk memory instruction, the apparatus performs at least one bulk memory operation on a block of memory specified by the instruction. The block size parameter sets an upper limit on the size of the block of memory on which the at least one bulk memory operation is performed. Hence, the size of the block of memory on which the at least one bulk memory operation is performed is no greater than the block size corresponding to the block size parameter. It is not essential that the full size indicated by the block size parameter is processed in the current instance of executing the bulk memory instruction. Some implementations may support processing less than the full size indicated by the block size parameter, with one or more later instances of executing the bulk memory instruction covering remaining portions of that block size.

The block size parameter specified by a bulk memory instruction is used to influence how bulk memory operations are handled. This recognises that the particular handling of bulk memory operations for large block sizes may not be the most appropriate way to handle bulk memory operations for small block sizes, and vice versa. A predetermined threshold can be set, for example, at the block size at which one way to handle the bulk memory operations becomes more efficient than another, in order to dynamically influence the handling of the block memory operations using a micro-architectural control action. Therefore, by using the micro-architectural control action to influence handling of the instruction based on the block size and the threshold, the bulk memory operation may be handled more appropriately or efficiently, and performance can be improved.

The micro-architectural control action may be an action which does not change the architectural effects of executing a sequence of instructions including the bulk memory instruction. In particular, the resulting state of memory after executing the sequence of instructions including the bulk memory instruction may be the same regardless of whether the micro-architectural control action is performed or not.

In some examples, in response to the block size corresponding to the block size parameter exceeding the predetermined threshold when the at least one bulk memory operation has at least one misaligned memory address operand, the control circuitry is configured to perform an alignment control action. Hence, the micro-architectural control action may be the alignment correction action.

In such examples, best performance is typically achieved when the address operands are aligned as much as possible. For example, if a misaligned memory operation accesses an unaligned word of data on either side of a memory address alignment boundary, two separate accesses may be required, and the undesired data may be masked out. By contrast, accessing an aligned word of data from an aligned address may require one memory access. However taking action to remedy a misalignment would take time and may cause a further loss of performance. The inventors recognised that whether the performance cost of the alignment correction action is worthwhile may depend on the block size specified by the block size parameter. In such examples, it would be more advantageous to take actions to correct the alignment for bulk memory instructions specifying a large block size, where the performance impacts of the misalignment would be amplified because there may be a large number of misaligned accesses caused by performing the bulk memory operation with misaligned addresses throughout, and so the improvement in performance caused by performing the alignment correction action may exceed the performance cost of the alignment correction action itself.

On the other hand, the control circuitry may, when the block size corresponding to the block size parameter does not exceed the predetermined threshold, allow the memory operation processing circuitry to tolerate misalignment of the at least one misaligned memory address operand when processing the at least one bulk memory operation.

In such examples, it may be more advantageous to simply tolerate a misalignment than to take the time to correct the misalignment. For example, for small block sizes, it is more likely that the time saved by performing aligned memory operations for a remaining part of the bulk memory operation after the alignment is corrected would be less than the time taken (and hence the performance impact) to correct the misalignment. In these cases, it would be faster to simply perform the misaligned bulk memory operation while tolerating the misalignment, and the control circuitry may suppress an alignment correction action.

In some examples, the at least one bulk memory operation comprises a sequence of memory operations, each memory operation being performed in a portion of the block of memory.

When executing a bulk memory instruction, a decoder may control the memory operation processing circuitry to perform a number of smaller memory operations. These smaller memory operations may be performed in a portion of the block of memory sized up to a maximum of the natural load/store width of the memory operation processing circuitry. The natural load/store width may be based on the size of a register or a data bus that connects the memory operation processing circuitry to memory.

In some examples, the alignment correction action comprises inserting a partial memory operation into the sequence of memory operations, wherein the partial memory operation specifies a portion of the block of memory, and an end of the portion of the block of memory is aligned with a memory address alignment boundary.

In such examples, there may be a consistent misalignment for each of the sequence of memory operations if the alignment correction action is not performed. A partial memory operation can be inserted to perform a memory operation on a portion of the block of memory, where the portion is sized to be smaller than the natural load/store width such that it ends at a memory address alignment boundary. Accordingly, if the alignment correction action is performed, alignment is restored for each subsequent memory operation in the sequence of memory operations.

In some examples, the memory operation processing circuitry is configured to perform at least one memory operation of the sequence of memory operations before the partial memory operation.

In such examples, some misaligned memory operations of the sequence of memory operations may have already been issued to the memory operation processing circuitry before it can be determined that there is a misalignment. For example, longer pipeline data processors will have more of a time gap between the decoding of the operations and the operand values being available. Rather than interrupting the memory operations that are already queued for performance, it may be more efficient to insert the partial memory operation later in the sequence in order to restore alignment for the subsequent memory operations in the sequence. The predetermined threshold can be set such that the partial memory operation would be inserted relatively early in the sequence of operations in order to realise a substantial performance benefit. As such, the partial memory operation would only be inserted for large block sizes.

In some examples, the alignment correction action comprises raising an exception.

In such examples, an exception can be raised to software. An exception handler in the operating system may handle the exception by performing a partial memory operation and updating the address operand and block size parameter for the bulk memory instruction before returning control to the background code to re-execute the bulk memory instruction. In re-executing the instruction, the alignment can be initialised correctly for the memory operation processing circuitry that is performing the bulk memory operation. This approach can be simpler for hardware micro-architecture designers, as the complexity in deciding how to perform the partial memory operation to perform an alignment correction action can be controlled by the software of the exception handler. However, this incurs the performance penalty of handling an exception. The predetermined threshold can be set at the block size beyond which a performance improvement can be expected from triggering the exception to correct the alignment, because performing the full bulk memory operation based on misaligned memory operations for block sizes exceeding that threshold would incur a larger performance impact than raising the exception.

In some examples, the decoding circuitry is configured to decode a prologue bulk memory instruction specifying a prologue block size parameter to control the memory operation processing circuitry to perform a prologue bulk memory operation on a block of memory of a size no greater than a prologue block size corresponding to the prologue block size parameter; and in response to the prologue bulk memory operation having at least one misaligned memory address operand, the memory operation processing circuitry is configured to perform a partial memory operation specifying a portion of the block of memory, wherein the end of the portion of the block of memory is aligned with a memory address alignment boundary regardless of whether the prologue block size corresponding to the prologue block size parameter exceeds the predetermined threshold.

A prologue bulk memory instruction may precede a main bulk memory instruction to prepare the state of memory such that the at least one bulk memory operation for the main bulk memory instruction is aligned for better performance. Since the prologue bulk memory instruction is architecturally intended to require a partial memory operation in a similar way to the partial memory operation described above (to achieve alignment for subsequent operations), it is performed regardless of the whether the prologue block size exceeds the predetermined threshold. However, the inventors recognised that, even in systems which support the prologue bulk memory instruction, sometimes despite the execution of the prologue bulk memory instruction, the memory address operand for the subsequent main bulk memory instruction may still end up misaligned, so it can be useful to support, for the main bulk memory instruction, determining whether to perform the alignment correction action based on the comparison of the block size parameter and the predetermined threshold.

In some examples, the memory operation processing circuitry is a first memory operation processing circuitry having a first natural transfer size; the apparatus further comprises a second memory operation processing circuitry having a second natural transfer size and supporting processing of the bulk memory instruction; and the first natural transfer size is different to the second natural transfer size.

In such examples, it is possible for a context switch to occur during execution of a bulk memory instruction, which may result in a different memory operation processing circuitry performing the at least one bulk memory operation. If the natural transfer size is different, then there is a greater chance of misalignment occurring (e.g. even if the prologue instruction had already been executed to cause alignment of the address operand based on the first natural transfer size on the first memory operation processing circuitry, after a transfer of the workload to the second memory operation processing circuitry the bulk memory operation may nevertheless end up misaligned due to the different natural transfer size on the second memory operation processing circuitry). Hence, the techniques described above can be particularly useful for systems having first and second memory operation processing circuitry capable of supporting the processing of the bulk memory instruction, which operate based on different natural transfer sizes.

In some examples, there is provided a cache configured to store data; and in response to the block size corresponding to the block size parameter exceeding the predetermined threshold, the control circuitry is configured to make an adjustment to a cache allocation policy used for addresses accessed by the bulk memory instruction until after the bulk memory instruction has been executed.

In such examples, a particular way that data is allocated to a cache, or in which cached data is selected for eviction, may be controlled by the cache allocation policy. By adjusting this policy, it is possible to effectively control how data is allocated to the cache while a bulk memory instruction is being executed. In particular, the allocation of data to the cache may be made more appropriate for the data being accessed during the execution of the bulk memory instruction. Hence, the micro-architectural control action may be making an adjustment to the cache allocation policy.

In some examples, the adjustment comprises an adjustment to reduce a probability of a given cache entry being allocated for data associated with the addresses accessed by the bulk memory instruction or an adjustment to increase a probability of evicting data associated with the addresses accessed by the bulk memory instruction.

In such examples, it is recognised that if the block size corresponding to the block size parameter is large enough, data allocated to the cache at the beginning of the at least one bulk memory operation may be evicted to make space for data accessed at the end of the at least one bulk memory operation, so a subsequent reference to the same block of memory is likely to miss for the early parts of that block of memory, causing further replacements so that it is likely that future references to the same block of memory will encounter a lot of cache misses. Allocating data to the cache that is expected to be evicted before use would be a waste of time and power, and would also risk other data being evicted from the cache which is more likely to be accessed again while remaining cached, leading to a reduction in performance. This scenario would be most apparent for larger block sizes, so controlling the probability of whether a given cache entry is allocated for the data for the at least one bulk memory operation, or the probability of whether the data for the at least one bulk memory operation is evicted, based on the comparison of the block size with the threshold, can be useful to improve performance.

The adjustment to the cache allocation policy could be implemented in a number of ways. In some ways, the adjustment may comprise disabling cache allocation for the addresses accessed by the bulk memory instruction until after the bulk memory instruction has been executed.

In another example, the adjustment to the cache allocation policy could comprise restricting allocation to a subset of the cache for addresses accessed by the bulk memory instruction (allocation to a further subset may remain unrestricted).

In another example, the adjustment to the cache allocation policy could comprise setting any entries allocated for addresses accessed by the bulk memory instruction to have increased priority for eviction. As entries allocated for addresses accessed by the bulk memory instruction are more likely to be evicted when a replacement needs to be made, the probability of entries remaining allocated for data associated with the addresses accessed by the bulk memory instruction is reduced.

Any of these examples of the adjustment to the cache allocation policy could be used alone or in combination.

In some examples, there is provided a processor comprising the memory operation processing circuitry.

A processor may take the form of any data processing circuitry capable of execution of instructions. For example, a processor may comprise a central processing unit (CPU), graphics processing unit (GPU) or a neural processing unit (NPU). A processor may have a number of execution circuitries, such as arithmetic-logic circuitry, floating point circuitry, branch circuitry, and load/store circuitry. The memory operation processing circuitry could be included among these execution circuitries, such that the processor may perform bulk memory operations in accordance with the present techniques. In some examples, the memory operation processing circuitry could be the load/store unit of the processor.

In some examples, there is provided a direct memory access (DMA) engine comprising the memory operation processing circuitry.

A DMA engine may be implemented to carry out memory operations on behalf of another part of the apparatus (e.g. a processor such as a CPU or GPU). The memory operation processing circuitry can be implemented into a DMA engine such that it may perform bulk memory operations in accordance with the present techniques.

The first and second memory operation processing circuitry described above could be two different processors, or could be a processor and a DMA engine, for example.

In some examples, there is provided a processor comprising the decoding circuitry and the memory operation processing circuitry; and a DMA engine comprising second memory operation processing circuitry; the micro-architectural control action comprises selecting one of the memory operation processing circuitry of the processor or the second memory operation processing circuitry of the DMA engine to perform the at least one bulk memory operation, depending on whether the block size corresponding to the block size parameter exceeds the predetermined threshold.

In such examples, the apparatus may control which memory operation processing circuitry carries out the at least one bulk memory operation. Since a bulk memory instruction is initially decoded by the decoding circuitry of the processor, performing the at least one bulk memory operation using the DMA engine's memory operation processing circuitry may necessitate various offloading operations. This may include memory write operations to configure control information for the DMA engine or issue DMA commands to the DMA engine. This may come with a certain amount of performance impact. However, doing so will allow the processor to continue performing other operations in parallel to the DMA engine. Therefore, depending on the block size, it may be more appropriate to perform the at least one bulk memory operation using the processor's memory operation processing circuitry, or the DMA engine's memory operation processing circuitry.

In some examples, the control circuitry is configured to select the second memory operation processing circuitry of the DMA engine to perform the at least one bulk memory operation when the block size corresponding to the block size parameter exceeds the predetermined threshold.

In such examples, it is recognised that for larger block sizes, the performance impact of the abovementioned offloading operations may be worthwhile to allow the processor to continue performing other operations in parallel with the DMA engine. However, for smaller block sizes, it may be more efficient for the processor to perform the at least one bulk memory operation, to avoid the performance impact of offloading the bulk memory operations to the DMA engine.

In some examples, the memory operation processing circuitry is capable of performing the at least one bulk memory operation with the block size corresponding to the block size parameter being a non-power-of-two number of bytes.

In some examples, the bulk memory instruction comprises a bulk copy instruction; and wherein the decoding circuitry is configured to decode the bulk memory copy instruction to control the memory operation processing circuitry to copy data from the block of memory to a destination block of memory or copy data from a source block of memory to the block of memory.

In some examples, the bulk memory instruction comprises a bulk memory set instruction; and wherein the decoding circuitry is configured to decode the bulk memory set instruction to control the memory operation processing circuitry to set data in the block of memory to a predetermined value.

In some examples, the bulk memory instruction comprises a bulk memory compare instruction; and wherein the decoding circuitry is configured to decode the bulk memory compare instruction to control the memory operation processing circuitry to compare data from the block of memory to a comparison value.

In such examples as above, the micro-architectural control action based on the block size and the threshold can be particularly useful for improving performance when handling bulk memory instructions which may be used to implement string processing functions from the string.h library in the C programming language, such as memcpy( ) memset( ) memcmp( ) memmove( ) etc. Moreover, it will be appreciated that the abovementioned performance issues do not only apply to functions written in C. Indeed, these problems apply to any equivalent or similar function in other programming languages too.

Particular embodiments will now be described with reference to the figures.

FIG. 1 illustrates an example of an apparatus 100 comprising various components for processing memory instructions. The apparatus 100 comprises an instruction fetch circuitry 102 for fetching instructions such as program instructions from memory. The instruction fetch circuitry 102 fetches instructions identified by a memory address and transmits the fetched instructions to an instruction decoder 104. The instruction decoder 104 decodes the fetched instructions to generate control signals to control the memory operation processing circuitry 106. The memory operation processing circuitry 106 performs memory operations on memory addresses specified by the instruction and accesses data in memory via load/store circuitry 108.

The instruction decoder 104 supports decoding of a bulk memory instruction which specifies at least one address operand, and a block size parameter indicating a size of a block of addresses in memory. The block of memory may be a contiguous block of memory, and may be indicated by the instruction specifying a start address operand and an end address operand (in that case, the block size parameter may be represented by the difference between the start/end address operands), or may be indicated by the instruction specifying a start address operand and a total copy size operand (in that case, the total copy size may be indicated by the block size parameter). The block of memory may be any size, including a non-power-of-two number of bytes.

The bulk memory instruction may be a bulk memory copy instruction, for which data is to be copied from one block of memory to another block of memory. The two blocks of memory may for example be specified in the instruction by two start address operands and a single block size operand indicating the size of both blocks of memory. The bulk memory instruction may alternatively be a bulk memory set instruction, for which data in a block of memory is set to a predetermined value (e.g. 0), that may be implicit (e.g. always fixed to 0 say), or may be variable and specified in the instruction itself as an immediate value or with reference to a particular register. The bulk memory instruction may alternatively be a bulk memory compare instruction, for which data in the block of memory is compared to a comparison value or to data stored at another block of memory. The comparison value may be specified in the instruction itself as an immediate value or with reference to a particular register, or using a further address operand to specify another block of memory.

The instruction decoder 104 decodes a bulk memory instruction and generates control signals to control the memory operation processing circuitry 106 to perform at least one bulk memory operation on the block of memory. The instruction decoder 104 may decode the bulk memory instruction into a sequence of operations, each being performed on a portion of the block of memory. Alternatively, the instruction decoder 104 may decode the bulk memory instruction such that the bulk memory operation reduces the specified block size parameter by the amount of memory (e.g. a number of bytes) that was processed in one iteration, and performs a conditional branch back to itself. The condition for evaluating the branch may be considered satisfied if the remaining size indicated by the block size parameter is greater than 0.

The apparatus 100 is provided with control circuitry 110 to determine whether the size of the block of memory indicated by a bulk memory instruction exceeds a predetermined threshold. The control circuitry 110 is capable of performing a micro-architectural control action in order to influence the handling of the at least one bulk memory operation, and the micro-architectural control action may be different depending on whether the block size exceeds the predetermined threshold or not. A control action may be described as micro-architectural if it does not change the architectural effects of a sequence of instructions including the bulk memory instruction. This is to mean that regardless of whether the micro-architectural control action is performed and what particular action is performed, the resulting state of memory will be the same after the sequence of instructions has been executed.

Note that, depending on the implementation of how the bulk memory instruction is handled in micro-architecture, the architectural effects of an individual instance of the bulk memory instruction might vary based on whether the micro-architectural control action is performed—e.g. with the alignment correction example discussed below, whether the alignment correction is performed or not may affect the amount of memory processed for the current iteration of the bulk memory instruction in an implementation where it is handled using a conditional branch to itself as explained above. Nevertheless, the behaviour of subsequent instances of the bulk memory instruction may then adapt so that the final result by the time the overall bulk memory operation has finished remains the same. Hence, even in such an implementation, the micro-architectural control action can be seen as a micro-architectural action rather than an architectural action (which is required by the instruction set architecture supported by the processor or which affects the long term result of the program being executed), because the architectural effects of the entire sequence of instructions still remains the same.

By influencing the handling of the bulk memory operations using such a micro-architectural control action, it is possible to perform the bulk memory instruction in a way that may be more appropriate for the specified size of the block of memory being processed, to improve the performance achieved in obtaining the results of the sequence of instructions being executed.

It will be appreciated that the apparatus shown in FIG. 1 is just one example, and other examples may have other components such as various additional pipeline stages, registers, and memory hierarchy components, as will be discussed later. The general arrangement of FIG. 1 is applicable to various scenarios in which the performance of the bulk memory operations would be preferably controllable.

Figure 2:
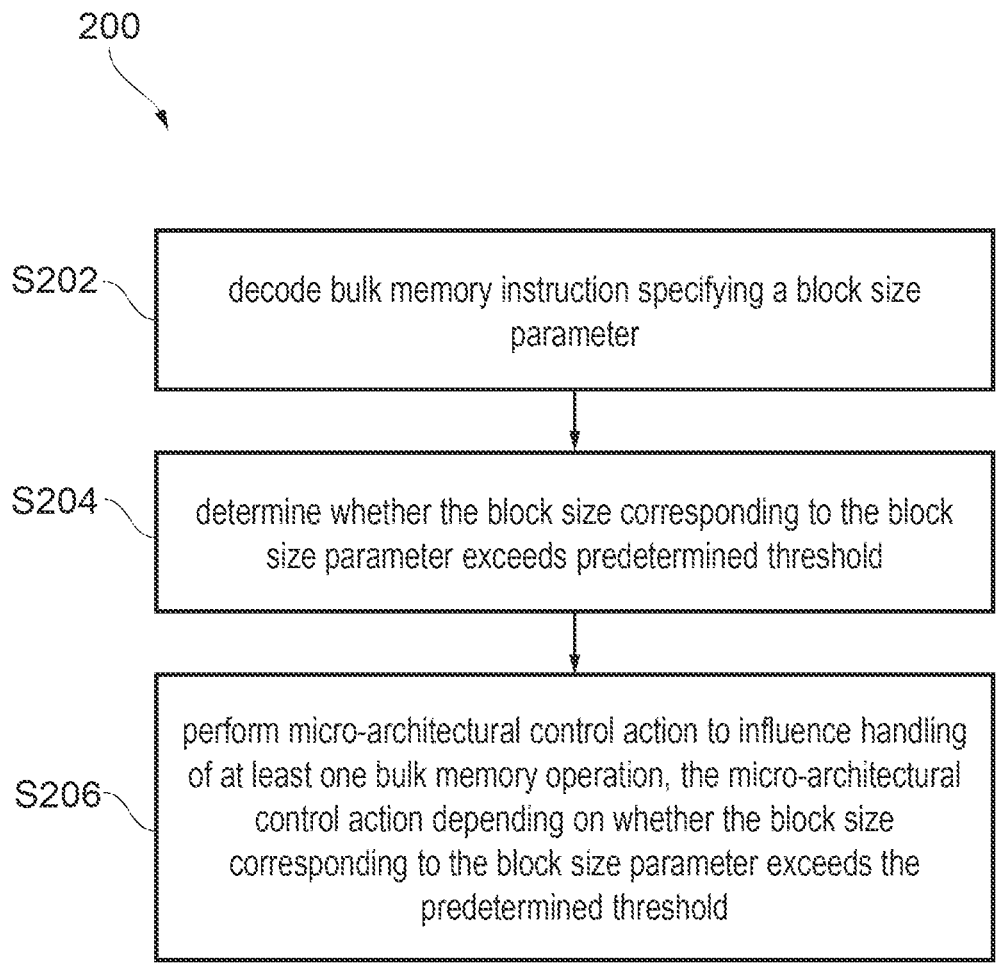
FIG. 2 illustrates a flow diagram for determining whether to perform a micro-architectural control action.

FIG. 2 illustrates a flow diagram showing a method 200 for determining whether to perform a micro-architectural control action. At step S202, the instruction decoder 104 decodes a bulk memory instruction specifying a block size parameter. In step S204, it is determined, by the control circuitry, whether the block size corresponding to the block size parameter exceeds a predetermined threshold. In step S206, the control circuitry 110 performs a micro-architectural control action, the micro-architectural control action depending on whether the block size corresponding to the block size parameter exceeds the predetermined threshold.

In some examples, the micro-architectural control action can be used to rectify alignment problems in the bulk memory operations.

A bulk memory instruction may be broken into a sequence of memory operations, each being performed on a successive portion of the block of memory specified in the bulk memory instruction. In some examples, the bulk memory instruction may be broken into memory operations that step through more than one block of memory. For example, in the bulk memory copy instruction as described above, the memory operation processing circuitry may perform a series of load operations on the source block of memory and a series of corresponding store operations to the destination block of memory. The size of each portion of the block of memory may be determined by the natural load/store size of the memory operation processing circuitry 106. The natural load/store size is the maximum amount of data that can be processed and delivered at one time on a data bus connecting the memory operation processing circuitry to the memory.

In a sequence of instructions, a bulk memory instruction may additionally be preceded by a prologue bulk memory instruction, which performs a partial memory operation in order to prepare the state of memory. For example, the partial memory operation may be performed on a portion of memory that is smaller than the natural load/store size, in order to align the end of the portion of memory with a memory address alignment boundary. Then, when the subsequent bulk memory instruction is executed, the memory operations that follow may be aligned with the memory address operands, thus making better use of the available bandwidth and improving performance.

Misalignment of memory address operands for the main bulk memory instruction can occur despite preceding it with the prologue instruction if, for example, a context switch occurs between the prologue bulk memory instruction and the end of the bulk memory instruction. In particular, if a different memory operation processing circuitry continues execution of the bulk memory instruction after the context switch, it is possible that the natural load/store width would be different, and so the previously prepared alignment would be unsuitable. Other examples may not support the prologue instruction at all, in which case the first instance of the main bulk memory instruction may also encounter misaligned addresses.

Figure 3:
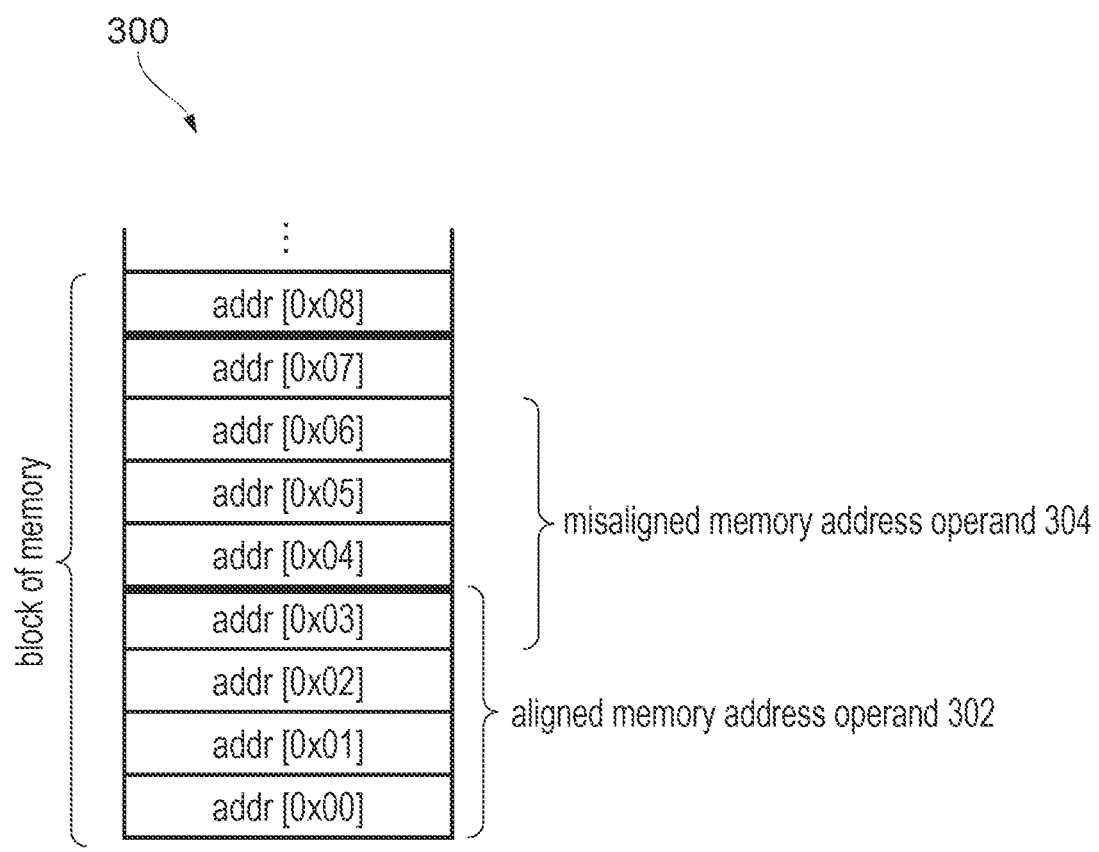
FIG. 3 illustrates aligned and misaligned memory address operands.

FIG. 3 shows an example of the block of memory 300 that may be specified by the bulk memory instruction. In this example, each address shown in FIG. 3 relates to 16 bytes of memory, with memory address alignment boundaries positioned at multiples of 64 bytes (indicated by the thicker lines). It will be appreciated that the present disclosure is not limited to 64 byte alignment—the alignment boundaries may be closer or further apart (e.g. 32 or 128 bytes). Also, although 16 byte portions are indicated for conciseness in FIG. 3, it will be appreciated that individual bytes within those portions may be separately addressable using byte addresses.

In examples where the memory operation has an aligned memory address operand 302, a word of data starting from the alignment boundary can be simply loaded from memory in a single transfer. In examples where the memory operation has a misaligned memory address operand 304, multiple words of data are loaded (e.g. the data between addr [0×00] and addr [0×07] is loaded from memory), then the data in addr [0×00] to addr [0×02] and addr [0×07] are masked out to obtain the unaligned word of data from addr [0×03] to addr [0×06].

Hence, if a bulk memory operation starts at an unaligned address, the alignment is not corrected, and the size of the block of memory being processed in the bulk memory operation is large, there will be a lot of unaligned accesses, and so the misaligned memory address operands result in a significant loss of performance due to the additional memory accesses that must be done in order to obtain the specified data.

Figure 4:
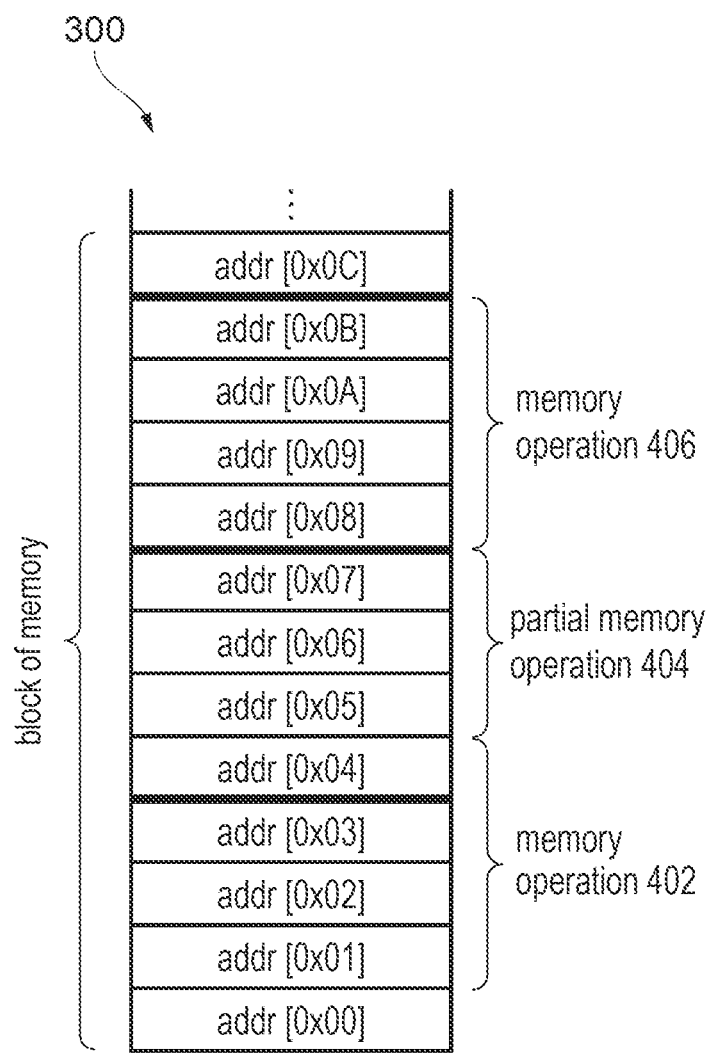
FIG. 4 illustrates the insertion of a partial memory operation into a sequence of memory operations.

One approach to rectify the alignment could be to perform a partial transfer in order to regain alignment for subsequent memory operations in a sequence of memory operations. FIG. 4 shows the block of memory 300 with data stored in the same way as in FIG. 3 above. A first memory operation 402 is performed on a portion of memory with a misaligned memory operand as discussed above. In response to the misaligned memory operand, the control circuitry 110 performs an alignment correction action to insert a partial memory operation 404. The partial memory operation 404 is performed on a smaller portion of memory between addr [0×05] and addr [0×07], such that the end of the portion of memory is aligned with a memory alignment boundary. When the next memory operation 406 is performed, it is aligned with the memory address operand between addr [0×08] and addr [0×0B]. In some examples, several memory operations may be performed before a partial memory operation. This may happen due to the operands not being known until after the bulk memory instruction is decoded, and the misalignment not being discovered until the operands are available to the memory operation processing circuitry 106. For small block sizes, the performance of the memory operations may be close to completing by the time the misalignment is detected. In which cases, it may be more worthwhile to simply finish performing the memory operations rather than inserting a partial memory operation. However, for larger block sizes, the performance gain from correcting the misalignment may be more beneficial.

Another approach to rectify the alignment of the memory operations is to raise an exception to software. In some examples, an apparatus such as apparatus 100 may be running software such as an operating system (OS), which is capable of handling such an exception. When handling an exception, the OS may attempt to perform some memory operations such as executing a prologue bulk memory instruction or load/store instructions to perform the partial memory operation, such that a partial memory operation is performed up to a memory alignment boundary. Then, the OS may adjust the operands of the bulk memory instruction to reflect that part of the bulk memory operation has been performed already, before returning control to the background code. Once the background code resumes, the apparatus can re-execute the bulk memory instruction, this time with correctly aligned memory address operands. However, raising and handling an exception is likely to incur a significant latency penalty. Therefore, it may only be beneficial to do so for larger block sizes, where the performance saving by allowing the remaining portion of the bulk memory operation to proceed with aligned memory accesses is greater than the performance impact of the latency penalty incurred by taking the exception.

According to the present techniques, the control circuitry 110 can perform an alignment correction action as the micro-architectural control action. If the block size corresponding to the block size parameter specified in the bulk memory instruction exceeds a predetermined threshold, then an alignment correction action, such as either of the above two approaches, may be performed to rectify the alignment. It will be appreciated that the relevant predetermined thresholds for the above approaches do not necessarily need to be the same, and will vary depending on the particular implementation of the present techniques.

Figure 5:
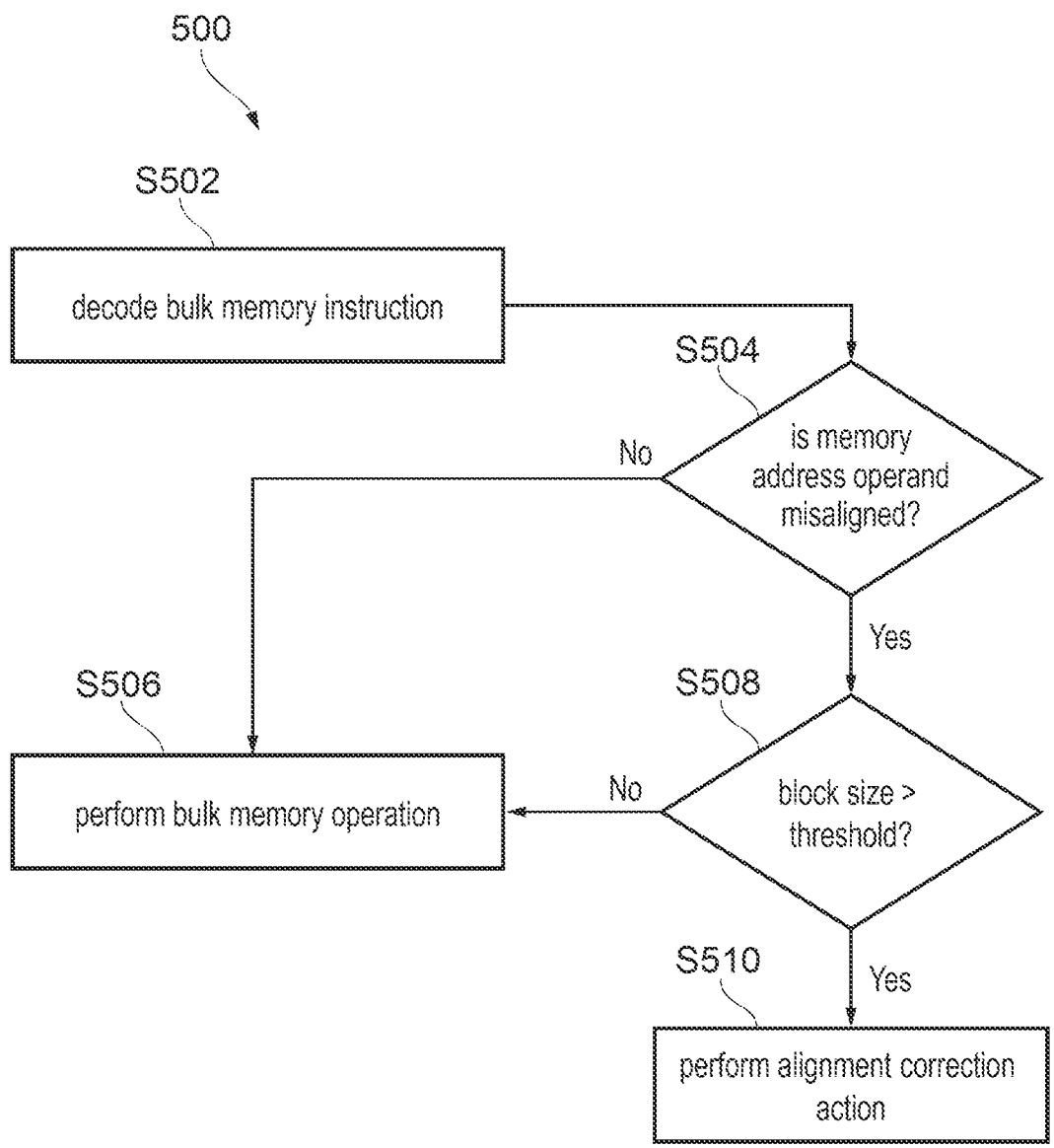
FIG. 5 illustrates a flow diagram for determining whether to perform an alignment correction action.

FIG. 5 shows a flow chart illustrating a method 500 for determining whether to perform an alignment correction action. A bulk memory instruction is decoded at step S502. It is then determined whether the memory address operand is misaligned at step S504. If the memory address operand is not misaligned, then no action is required, and the memory operation processing circuitry 106 can perform the bulk memory operation as normal at step S506. However, if a memory address operand is misaligned, then the control circuitry 110 determines whether the block size corresponding to the block size parameter exceeds a predetermined threshold at step S508. The predetermined threshold may be appropriately set such that for larger block sizes, the performance loss from an alignment correction action as discussed above is less than the performance loss of performing the remaining memory operations with sub-optimal alignment. If it is determined at S508 that the block size does not exceed the predetermined threshold, then the control circuitry 110 allows the memory operation processing circuitry 106 to tolerate the misalignment and perform the bulk memory operation at step S506. If the block size does exceed the predetermined threshold, then the control circuitry 110 performs an alignment correction action at step S510.

In some examples, the micro-architectural control action can be used to control cache allocation during execution of a bulk memory instruction.

Figure 6:
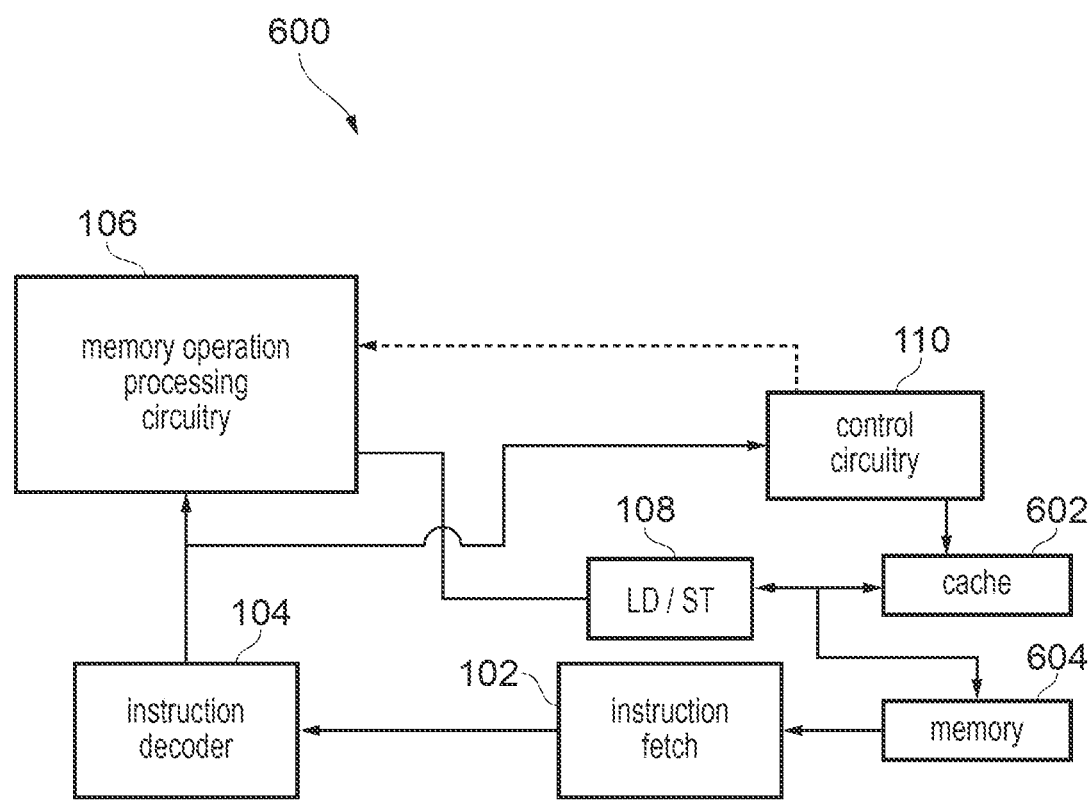
FIG. 6 illustrates another example apparatus.

FIG. 6 illustrates an example of an apparatus 600 for processing memory operations. The apparatus 600 comprises many of the same components as the apparatus 100, indicated by identical reference numerals. A detailed description of these components will not be repeated for brevity, but it can be assumed that they are substantially the same as in the apparatus 100.

Apparatus 600 comprises a cache 602 containing a small amount of memory that is close to the memory operation processing circuitry 106, and so can be accessed quickly. The cache 602 may be used to store data that has been recently loaded from or stored to memory 604 by the load/store circuitry 108, and is anticipated to be used again. The cache 602 is coupled to control circuitry 110 which is capable of performing a micro-architectural control action in response to instructions decoded by the instruction decoder 104.

For cacheable load/store operations other than those performed for the bulk memory instruction, a cache such as cache 602 may store data that has been recently accessed from memory 604, selecting the addresses for which data is to be cached according to a cache allocation policy. However, when a bulk memory instruction is executed, there is a potentially large amount of data that is loaded from and/or stored into memory 604. In some examples, it may be unnecessary to store data into the cache 602, especially if the block size corresponding to the block size parameter is very large.

For example, in the apparatus 600, before execution of a bulk memory instruction the cache 602 may contain various data that may be anticipated to be used in the near future. When a bulk memory instruction is executed, data that is loaded from or stored to memory 604 may be allocated to the cache 602, causing at least some of the data already stored to be evicted. In some examples, it may be considered that data loaded or stored during a bulk memory instruction may be less likely to be used in future than the data that was already present in the cache 602. Any data that is required after being evicted would have to be re-fetched from memory 604, causing a loss of performance.

Also, in some examples with very large block sizes, it is also possible to evict all (or a large fraction) of the data in the cache 602, and even to start evicting data that was stored earlier in the performance of the bulk memory operation to make space for data that is stored later in the bulk memory operation. Therefore, the storage of data earlier in the execution of the instruction may be of no use to the memory operation processing circuitry 106, and is therefore a waste of time and power.

In other examples with smaller block sizes, there may be value to retain data that is accessed during performance of the bulk memory operation in anticipation that the data would be used again in the near future. As such, it may be preferable to still store data in the cache in the usual way for those block sizes.

It will be appreciated that the cache 602 does not need to be configured as described above, and may be configured to have any capacity or allocation policy. Additionally, the bulk memory instruction could potentially specify any size of block of memory, including a non-power-of-two number of bytes.

According to the present techniques, the above problem can be solved by controlling cache allocation when handling the bulk memory operations. In particular, if the control circuitry 110 determines that the block size corresponding to the block size parameter exceeds a predetermined threshold, the cache allocation policy can be adjusted for the memory addresses accessed by the bulk memory instruction until after the bulk memory instruction has been executed. This adjustment may reduce a probability of a given cache entry being allocated for data associated with the addresses accessed by the bulk memory instruction, or may increase a probability of evicting data associated with the addresses accessed by the bulk memory instruction. In some examples, the adjustment may be to restrict allocation of the data from addresses accessed by the bulk memory instruction to a particular portion of the cache, or disabling allocation of such data altogether. In some examples, data associated with the addresses accessed by the bulk memory instruction may be marked as "low priority" when allocated to the cache. The cache may then be configured to evict "low priority" data in preference to other, potentially more useful, data.

In some examples, a threshold may be based on the capacity of the cache 602 or on a fraction of the capacity of the cache 602. In such examples, the cache 602 is more likely not to evict too much useful data to allocate data less likely to be useful in future, thereby saving the time and power and improving performance.

The control circuitry 110 of this example may also be coupled to the memory operation processing circuitry (shown by dashed arrow in FIG. 6), as in FIG. 1. Therefore, the control circuitry 110 may perform the alignment correction actions discussed previously in addition to controlling cache allocation. Furthermore, it is likely that an appropriate threshold for performing an alignment correction action may be different to an appropriate threshold for cache allocation. As such, the control circuitry 110 may determine whether the block size exceeds one or more of a plurality of different predetermined thresholds, each predetermined threshold corresponding to a different micro-architectural control action.

Figure 7:
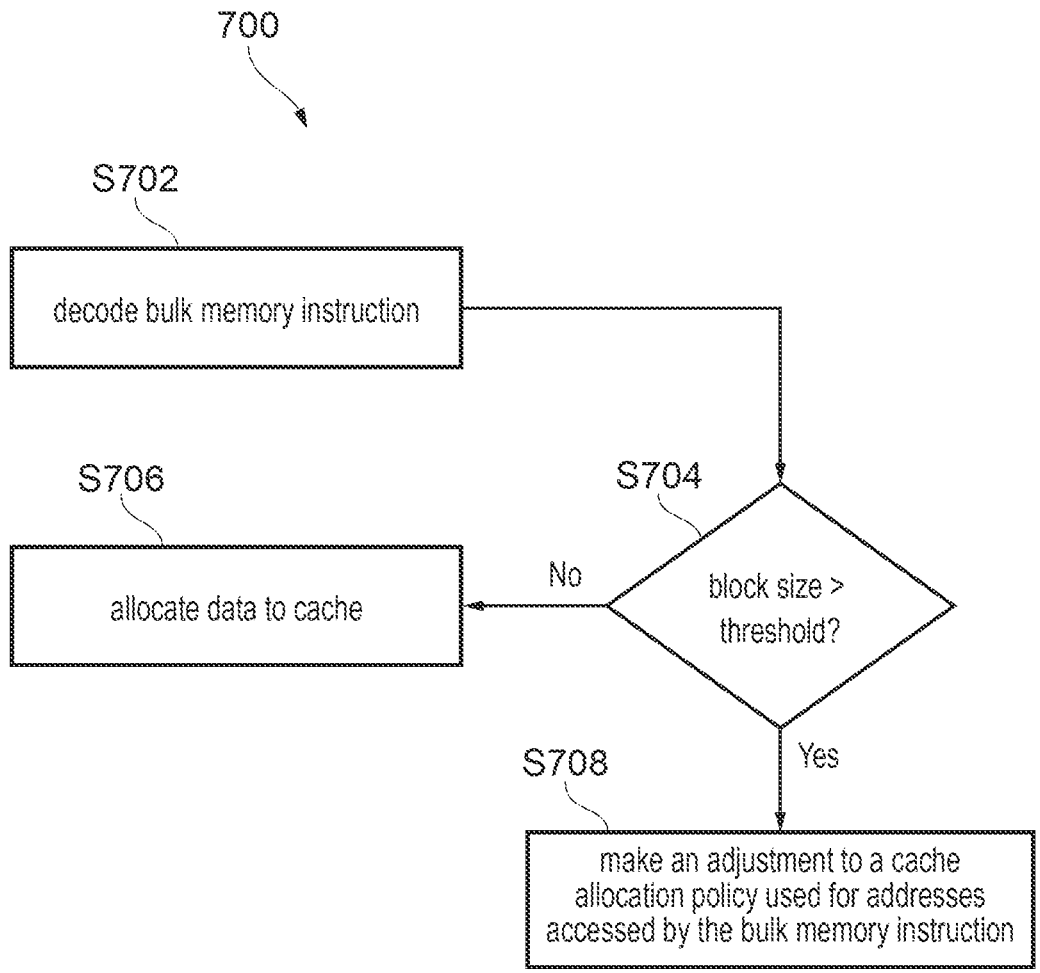
FIG. 7 illustrates a flow diagram for determining whether to make an adjustment to a cache allocation policy.

FIG. 7 shows a flow chart illustrating a method 700 for determining whether to make an adjustment to a cache allocation policy for addresses accessed by the bulk memory instruction. A bulk memory instruction is decoded at step S702. The control circuitry 110 then determines whether the block size corresponding to the block size parameter exceeds a predetermined threshold at step S704. If it is determined that the block size does not exceed the predetermined threshold, then the control circuitry 110 allows the data accessed for the bulk memory operations to be allocated to the cache 602 in step S706. If it is determined that the block size does exceed the predetermined threshold, then the control circuitry 110 performs a micro-architectural control action to make an adjustment to a cache allocation policy for addresses accessed by the bulk memory instruction in step S708.

The adjustment made in S708 may be to reduce a probability of a given cache entry being allocated for data associated with the addresses accessed by the bulk memory instruction, or to increase a probability of evicting data associated with the addresses accessed by the bulk memory instruction. In such examples, the adjustment may restrict allocation of data associated with the addresses accessed by the bulk memory instruction. In particular, allocation could be restricted to only a portion of the cache, or may be disabled altogether. In other examples, data associated with the addresses accessed by the bulk memory instruction may be marked as having higher priority for eviction. When allocating new data to the cache, the "higher eviction priority" entries may be evicted before other, potentially more useful, data.

Figure 8:
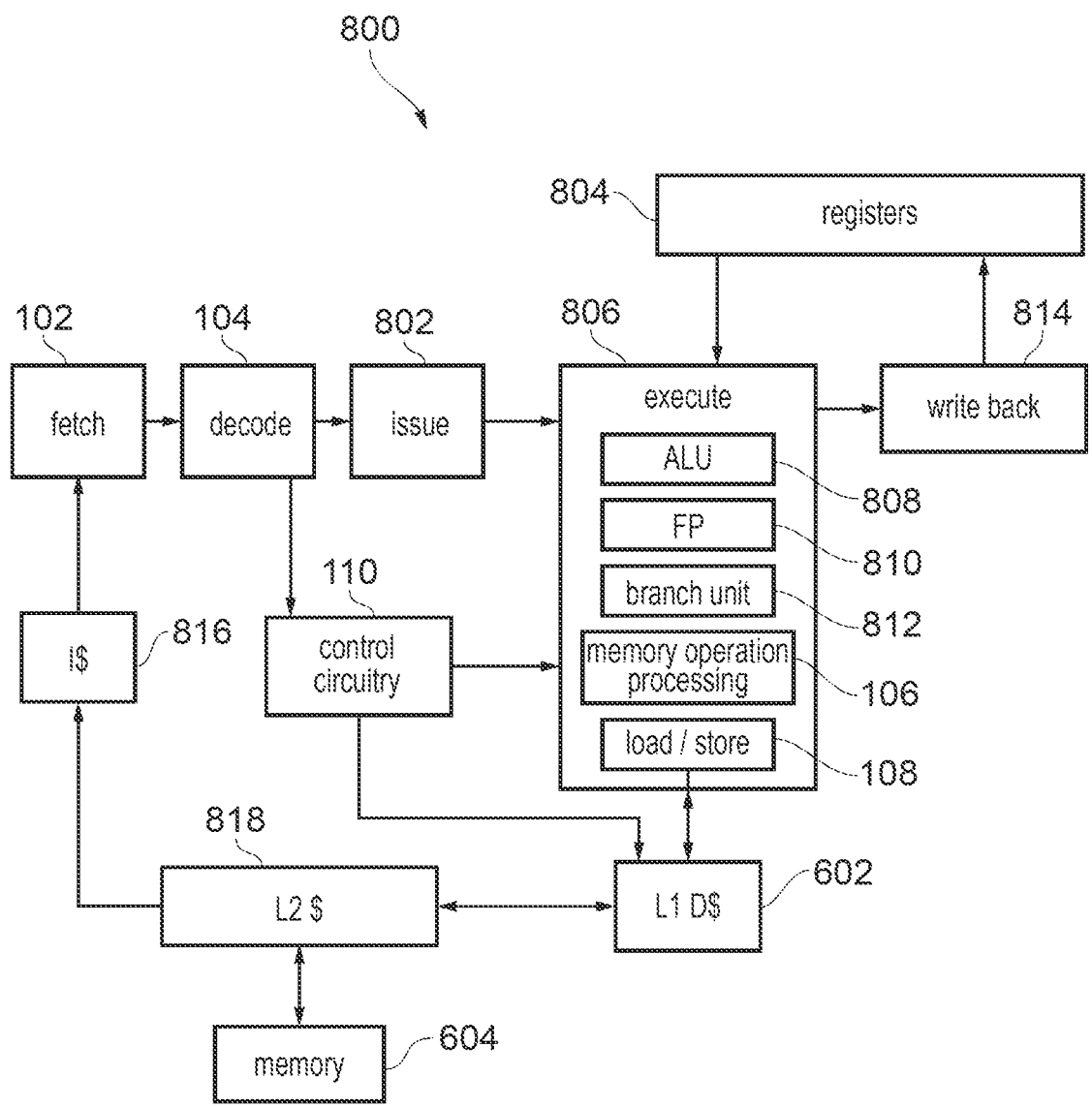
FIG. 8 illustrates a an example processor.

FIG. 8 shows an example in which the present techniques are implemented in a processor 800. The processor 800 may take the form of a central processing unit (CPU), a graphics processing unit (GPU) or a neural processing unit (NPU) or the like. The processor 800 comprises a pipeline comprising fetch circuitry 102, decoding circuitry 104, and issue circuitry 802. The fetch circuitry 102 and decoding circuitry 104 may be similar to the instruction fetch circuitry 102 and instruction decoder 104 of previous examples, and detailed description of them will not be repeated for brevity. The issue circuitry 802 includes an issue queue which queues instructions awaiting execution until the required operands for processing those instructions are available in the registers 804.

Execution circuitry 806 comprises various data processing circuitries such as arithmetic-logic circuitry 808, floating point circuitry 810, branch circuitry 812, memory operation processing circuitry 106 and load/store circuitry 108. The memory operation processing circuitry 106 and load/store circuitry 108 may include the memory operation processing circuitry 106 and load/store circuitry 108 of previous examples, and a detailed description of them will not be repeated for brevity. The execution circuitry 806 performs data processing operations on data and stores resulting data in registers 804 via write back circuitry 814.

The processor 800 further comprises a memory hierarchy comprising an instruction cache 816, a data cache 602, an L2 cache 818 and memory 604. The data cache 602 and memory 604 may be configured in a similar way as the cache 602 and memory 604 of previous examples, and a detailed description of them will not be repeated for brevity.

The processor 800 comprises control circuitry 110, which is coupled to the execute circuitry 806 and the data cache 602. The control circuitry 110 is capable of performing a micro-architectural control action, as discussed in either or both previous examples, to influence the handling of the bulk memory operation by the memory operation processing circuitry 106, in response to a bulk memory instruction being decoded by the decoding circuitry 104.

In some examples, where the bulk memory operations may be performed by one of a plurality of different memory operation processing circuitries, the micro-architectural control action can be used to select a memory operation processing circuitry to perform the operation.

Figure 9:
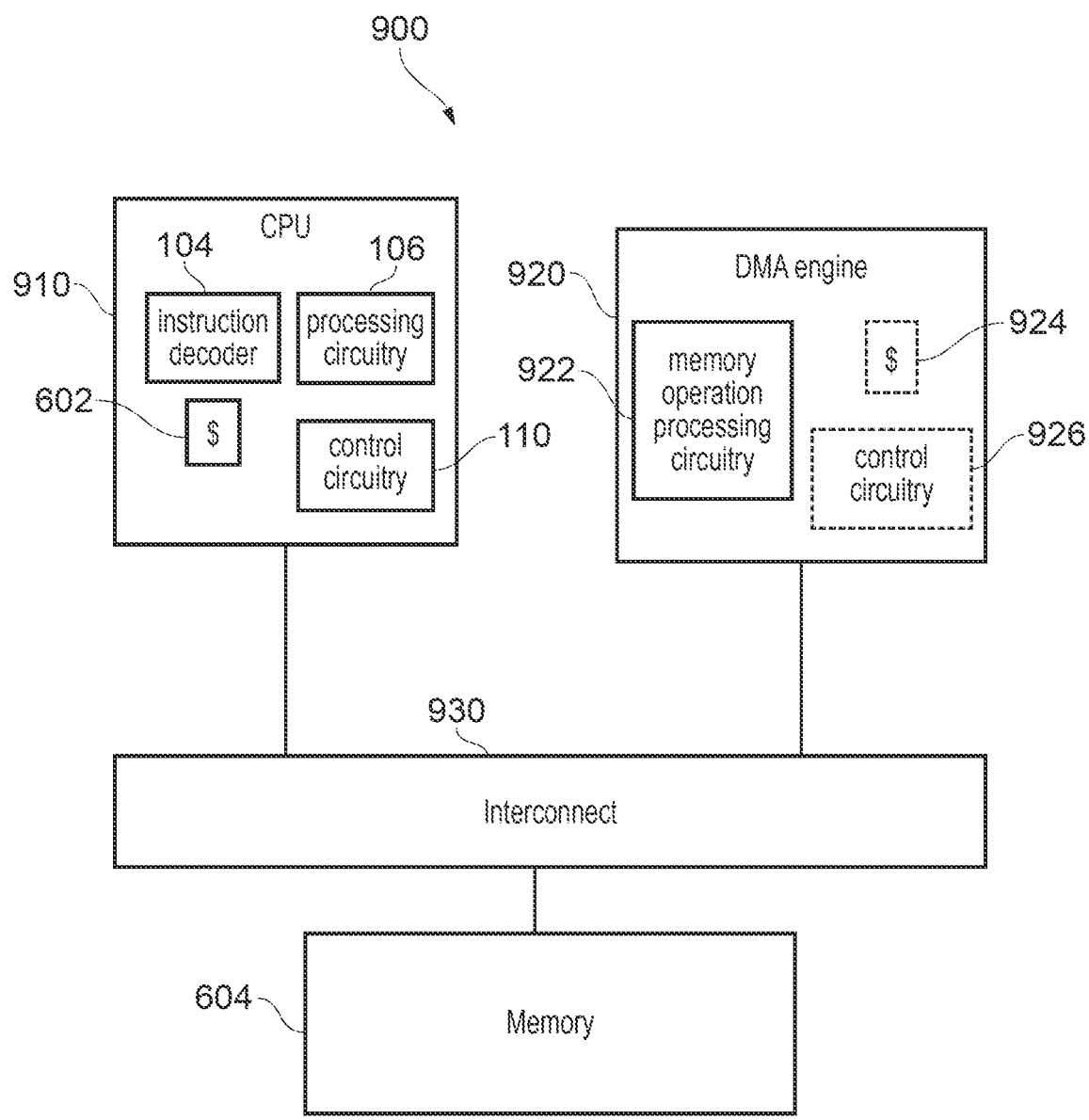
FIG. 9 illustrates an example data processing system comprising a central processing unit and a direct memory access engine.

FIG. 9 shows an example of a data processing system 900, in which a CPU 910 configured in a similar way as processor 800 is coupled to such another apparatus capable of handling bulk memory operations, such as a direct memory access (DMA) engine 920. As above, it will be appreciated that the CPU may instead be a GPU or NPU or any other kind of processor. The CPU 910 and DMA engine 920 are coupled to the memory 604 and each other via interconnect 930. The DMA engine 920 comprises its own memory operation processing circuitry 922 and optionally a cache 924, that may be substantially the same as the memory operation processing circuitry 106 and cache 602 discussed previously. The DMA engine 920 may optionally also comprise control circuitry 926 that may be the same or different to the control circuitry 110 as discussed in previous examples. In particular, the control circuitry 926 may be limited to a subset of the micro-architectural control actions that may be performed by the control circuitry 110.

A DMA engine such as DMA engine 920 may be used to offload memory operations from the CPU 910, such that the CPU 910 can continue performing other data processing operations. However, when executing bulk memory instructions specifying small block sizes, the additional performance of performing other data processing operations in parallel with bulk memory operations may be less than the added latency of transferring the bulk memory operation to the DMA engine 920. This results in an overall reduction in performance.

The present techniques can be applied such that control circuitry 110 in CPU 910 performs a micro-architectural control action to select the memory operation processing circuitry 106 of the CPU 910 or the memory operation processing circuitry 922 of the DMA engine 920 to perform the bulk memory operation. If the block size exceeds the predetermined threshold, the control circuitry 110 may select the DMA engine 920 to perform the bulk memory operation.

The predetermined threshold may be preferably set such that for block sizes that exceed it, the performance loss in transferring the bulk memory operation to the DMA engine 920 is expected to be less than the performance gain in performing other data processing in parallel by the CPU 910. However, it is noted that the workload that is available to be performed in parallel by the CPU 910 may be variable.

Hence, the predetermined threshold may be set based on an average workload that would be available for the CPU 910 to perform in parallel. Since the threshold would be based on an average, there may be occasions where the selection of whether to offload the bulk memory operations is incorrect in hindsight, and results in reduced performance, but there may be an overall performance gain over time. Alternatively, the threshold block size for offloading to the DMA engine could be set based on information associated with the particular workload currently performed, or based on information about the current utilisation of the CPU pipeline, which may help with more accurate predictions of whether it is likely to be beneficial to offload the bulk memory operation to the DMA engine 920. In some examples, the threshold may be set slightly higher, in order to take account of the latency of a possible misalignment correction action by the control circuitry 926 of the DMA engine 920. In such examples, the threshold may be set such that the combined performance loss of transferring the bulk memory operation to the DMA engine 920 and the alignment correction action is less than the performance gain in performing other data processing in parallel by the CPU 910.

Figure 10:
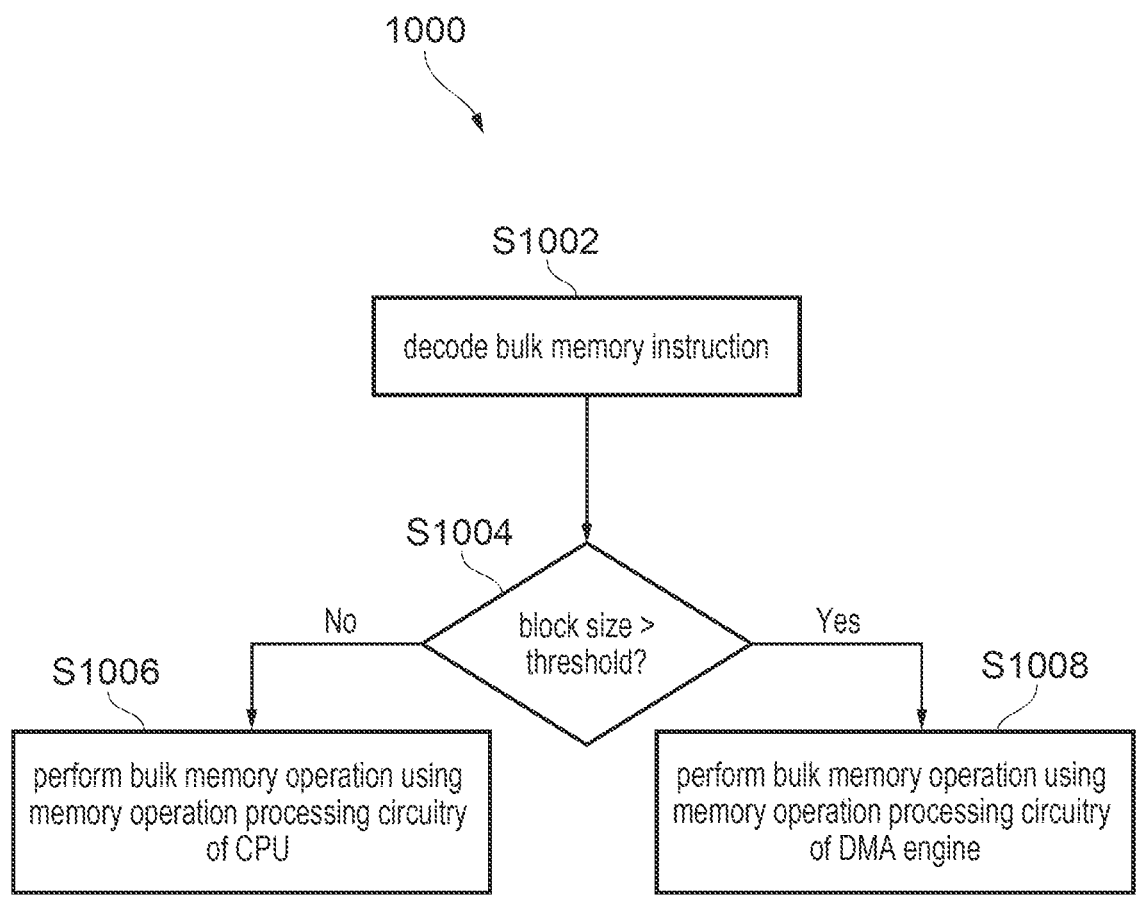
FIG. 10 illustrates a flow diagram for determining whether to perform a bulk memory operation using the memory operation processing circuitry of a central processing unit or a direct memory access engine.

FIG. 10 shows a flow chart illustrating a method 1000 for determining whether to perform the bulk memory operation using the memory operation processing circuitry of the CPU 910 or the DMA engine 920. A bulk memory instruction is decoded at step S1002. The control circuitry 110 determines whether the block size exceeds a predetermined threshold at step S1004. If the block size does not exceed the predetermined threshold, then the bulk memory operation is performed using the memory operation processing circuitry 106 of the CPU 910 at step S1006. If the block size does exceed the predetermined threshold, then the bulk memory operation is performed using the memory operation processing circuitry 922 of the DMA engine 920 at step S1008.

It will be appreciated that the control circuitry 110 and control circuitry 926 described in this example may be implemented to additionally perform one or more of the previously described example micro-architectural control actions in any combination.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

According to some examples, the present technique includes:

(1) An apparatus comprising:
  decoding circuitry to decode instructions;
  memory operation processing circuitry to perform memory operations;
  wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and
  the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold.

(2) The apparatus according to clause 1, wherein:
  in response to the block size corresponding to the block size parameter exceeding the predetermined threshold when the at least one bulk memory operation has at least one misaligned memory address operand, the control circuitry is configured to perform an alignment correction action.

(3) The apparatus according to clause 2, wherein:
  the control circuitry is configured, when the block size corresponding to the block size parameter does not exceed the predetermined threshold, to allow the memory operation processing circuitry to tolerate misalignment of the at least one misaligned memory address operand when processing the at least one bulk memory operation.

(4) The apparatus according to clauses 2 or 3, wherein:
  the at least one bulk memory operation comprises a sequence of memory operations, each memory operation being performed in a portion of the block of memory.

(5) The apparatus according to clause 4, wherein:
  the alignment correction action comprises inserting a partial memory operation into the sequence of memory operations, wherein the partial memory operation specifies a portion of the block of memory, and an end of the portion of the block of memory is aligned with a memory address alignment boundary.

(6) The apparatus according to clause 5, wherein:
  the memory operation processing circuitry is configured to perform at least one memory operation of the sequence of memory operations before the partial memory operation.

(7) The apparatus according to any of clauses 2 to 4, wherein:
  the alignment correction action comprises raising an exception.

(8) The apparatus according to any preceding clause, wherein:
  the decoding circuitry is configured to decode a prologue bulk memory instruction specifying a prologue block size parameter to control the memory operation processing circuitry to perform a prologue bulk memory operation on a block of memory of a size no greater than a prologue block size corresponding to the prologue block size parameter; and
  in response to the prologue bulk memory operation having at least one misaligned memory address operand, the memory operation processing circuitry is configured to perform a partial memory operation specifying a portion of the block of memory, wherein the end of the portion of the block of memory is aligned with a memory address alignment boundary regardless of whether the prologue block size corresponding to the prologue block size parameter exceeds the predetermined threshold.

(9) The apparatus according to any preceding clause, wherein:
the memory operation processing circuitry is a first memory operation processing circuitry having a first natural transfer size;
the apparatus further comprises a second memory operation processing circuitry having a second natural transfer size and supporting processing of the bulk memory instruction; and
the first natural transfer size is different to the second natural transfer size.

(10) The apparatus according to any preceding clause, further comprising:
a cache configured to store data; and
in response to the block size corresponding to the block size parameter exceeding the predetermined threshold, the control circuitry is configured to make an adjustment to a cache allocation policy used for addresses accessed by the bulk memory instruction until after the bulk memory instruction has been executed.

(11) The apparatus according to clause 10, wherein:
the adjustment comprises an adjustment to reduce a probability of a given cache entry being allocated for data associated with the addresses accessed by the bulk memory instruction.

(12) The apparatus according to clause 10, wherein:
the adjustment comprises an adjustment to increase a probability of evicting data associated with the addresses accessed by the bulk memory instruction.

(13) The apparatus of any preceding clause, wherein:
a processor comprises the memory operation processing circuitry.

(14) The apparatus of any of clauses 1 to 10, wherein:
a direct memory access engine comprises the memory operation processing circuitry.

(15) The apparatus of any of clauses 1 to 11, comprising:
a processor comprising the decoding circuitry and the memory operation processing circuitry; and
a direct memory access engine comprising second memory operation processing circuitry;
the micro-architectural control action comprises selecting one of the memory operation processing circuitry of the processor or the second memory operation processing circuitry of the direct memory access engine to perform the at least one bulk memory operation, depending on whether the block size corresponding to the block size parameter exceeds the predetermined threshold.

(16) The apparatus of clause 13, wherein the control circuitry is configured to select the second memory operation processing circuitry of the direct memory access engine to perform the at least one bulk memory operation when the block size corresponding to the block size parameter exceeds the predetermined threshold.

(17) The apparatus according to any preceding clause, wherein:
the memory operation processing circuitry is capable of performing the at least one bulk memory operation with the block size corresponding to the block size parameter being a non-power-of-two number of bytes.

(18) The apparatus according to any preceding clause, wherein:
the bulk memory instruction comprises one of:
a bulk memory copy instruction to control the memory operation processing circuitry to copy data from the block of memory to a destination block of memory or copy data from a source block of memory to the block of memory;
a bulk memory set instruction to control the memory operation processing circuitry to set data in the block of memory to a predetermined value; and
a bulk memory compare instruction to control the memory operation processing circuitry to compare data from the block of memory to a comparison value or to a comparison block of memory.

(19) A method comprising:
decoding a sequence of instructions;
performing memory operations;
wherein the decoding includes decoding a bulk memory instruction specifying a block size parameter to control performance of at least one bulk memory operation on a block of memory of a size no greater than a block size corresponding to the block size parameter; and
determining whether the block size corresponding to the block size parameter exceeds a predetermined threshold, and performing a micro-architectural control action to influence handling of the at least one bulk memory operation, the micro-architectural control action depending on whether the block size corresponding to the block size parameter exceeds the predetermined threshold.

(20) A non-transitory computer-readable medium to store computer-readable code for fabrication of an apparatus comprising:
decoding circuitry to decode instructions;
memory operation processing circuitry to perform memory operations;
wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and
the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold.

The invention claimed is:

1. An apparatus comprising:
decoding circuitry to decode instructions;
memory operation processing circuitry to perform memory operations;
wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and
the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold, wherein:

in response to the block size corresponding to the block size parameter exceeding the predetermined threshold when the at least one bulk memory operation has at least one misaligned memory address operand, the control circuitry is configured to perform an alignment correction action.

2. The apparatus according to claim 1, wherein:
the control circuitry is configured, when the block size corresponding to the block size parameter does not exceed the predetermined threshold, to allow the memory operation processing circuitry to tolerate misalignment of the at least one misaligned memory address operand when processing the at least one bulk memory operation.

3. The apparatus according to claim 1, wherein:
the at least one bulk memory operation comprises a sequence of memory operations, each memory operation being performed in a portion of the block of memory.

4. The apparatus according to claim 3, wherein:
the alignment correction action comprises inserting a partial memory operation into the sequence of memory operations, wherein the partial memory operation specifies a portion of the block of memory, and an end of the portion of the block of memory is aligned with a memory address alignment boundary.

5. The apparatus according to claim 4, wherein:
the memory operation processing circuitry is configured to perform at least one memory operation of the sequence of memory operations before the partial memory operation.

6. The apparatus according to claim 1, wherein:
the alignment correction action comprises raising an exception.

7. The apparatus according to claim 1, wherein:
the decoding circuitry is configured to decode a prologue bulk memory instruction specifying a prologue block size parameter to control the memory operation processing circuitry to perform a prologue bulk memory operation on a block of memory of a size no greater than a prologue block size corresponding to the prologue block size parameter; and
in response to the prologue bulk memory operation having at least one misaligned memory address operand, the memory operation processing circuitry is configured to perform a partial memory operation specifying a portion of the block of memory, wherein the end of the portion of the block of memory is aligned with a memory address alignment boundary regardless of whether the prologue block size corresponding to the prologue block size parameter exceeds the predetermined threshold.

8. The apparatus according to claim 1, wherein:
the memory operation processing circuitry is a first memory operation processing circuitry having a first natural transfer size;
the apparatus further comprises a second memory operation processing circuitry having a second natural transfer size and supporting processing of the bulk memory instruction; and
the first natural transfer size is different to the second natural transfer size.

9. The apparatus of claim 1, wherein:
a processor comprises the memory operation processing circuitry.

10. The apparatus of claim 1, wherein:
a direct memory access engine comprises the memory operation processing circuitry.

11. The apparatus according to claim 1, wherein:
the memory operation processing circuitry is capable of performing the at least one bulk memory operation with the block size corresponding to the block size parameter being a non-power-of-two number of bytes.

12. The apparatus according to claim 1, wherein:
the bulk memory instruction comprises one of:
a bulk memory copy instruction to control the memory operation processing circuitry to copy data from the block of memory to a destination block of memory or copy data from a source block of memory to the block of memory;
a bulk memory set instruction to control the memory operation processing circuitry to set data in the block of memory to a predetermined value; and
a bulk memory compare instruction to control the memory operation processing circuitry to compare data from the block of memory to a comparison value or to a comparison block of memory.

13. An apparatus comprising:
decoding circuitry to decode instructions;
memory operation processing circuitry to perform memory operations;
wherein the decoding circuitry is configured to decode a bulk memory instruction specifying a block size parameter to control the memory operation processing circuitry to perform at least one bulk memory operation on a block of memory of a size no greater than a block size corresponding to the block size parameter; and
the apparatus comprises:
control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold; and
a cache configured to store data; and
in response to the block size corresponding to the block size parameter exceeding the predetermined threshold, the control circuitry is configured to make an adjustment to a cache allocation policy used for addresses accessed by the bulk memory instruction until after the bulk memory instruction has been executed.

14. The apparatus according to claim 13, wherein:
the adjustment comprises an adjustment to reduce a probability of a given cache entry being allocated for data associated with the addresses accessed by the bulk memory instruction.

15. The apparatus according to claim 13, wherein:
the adjustment comprises an adjustment to increase a probability of evicting data associated with the addresses accessed by the bulk memory instruction.

16. A non-transitory computer-readable medium to store computer-readable code for fabrication of an apparatus according to claim 13.

17. An apparatus comprising:
a processor comprising:
decoding circuitry to decode instructions; and
memory operation processing circuitry to perform memory operations;

wherein the decoding circuitry is configured to decode a bulk memory instruction specifying a block size parameter to control the memory operation processing circuitry to perform at least one bulk memory operation on a block of memory of a size no greater than a block size corresponding to the block size parameter;

the apparatus comprises control circuitry to determine whether the block size corresponding to the block size parameter exceeds a predetermined threshold, and perform a micro-architectural control action to influence handling of the at least one bulk memory operation by the memory operation processing circuitry, the micro-architectural control action depending on whether the block size corresponding to the block size parameter exceeds the predetermined threshold;

the apparatus comprises a direct memory access engine comprising second memory operation processing circuitry; and the micro-architectural control action comprises selecting one of the memory operation processing circuitry of the processor or the second memory operation processing circuitry of the direct memory access engine to perform the at least one bulk memory operation, depending on whether the block size corresponding to the block size parameter exceeds the predetermined threshold.

18. The apparatus of claim 17, wherein the control circuitry is configured to select the second memory operation processing circuitry of the direct memory access engine to perform the at least one bulk memory operation when the block size corresponding to the block size parameter exceeds the predetermined threshold.

19. A non-transitory computer-readable medium to store computer-readable code for fabrication of an apparatus according to claim 17.

20. A non-transitory computer-readable medium to store computer-readable code for fabrication of an apparatus according to claim 1.

* * * * *